2,926,132
UPGRADING PETROLEUM NAPHTHAS CONTAINING UNSATURATED HYDROCARBONS AND SULFUR COMPOUNDS

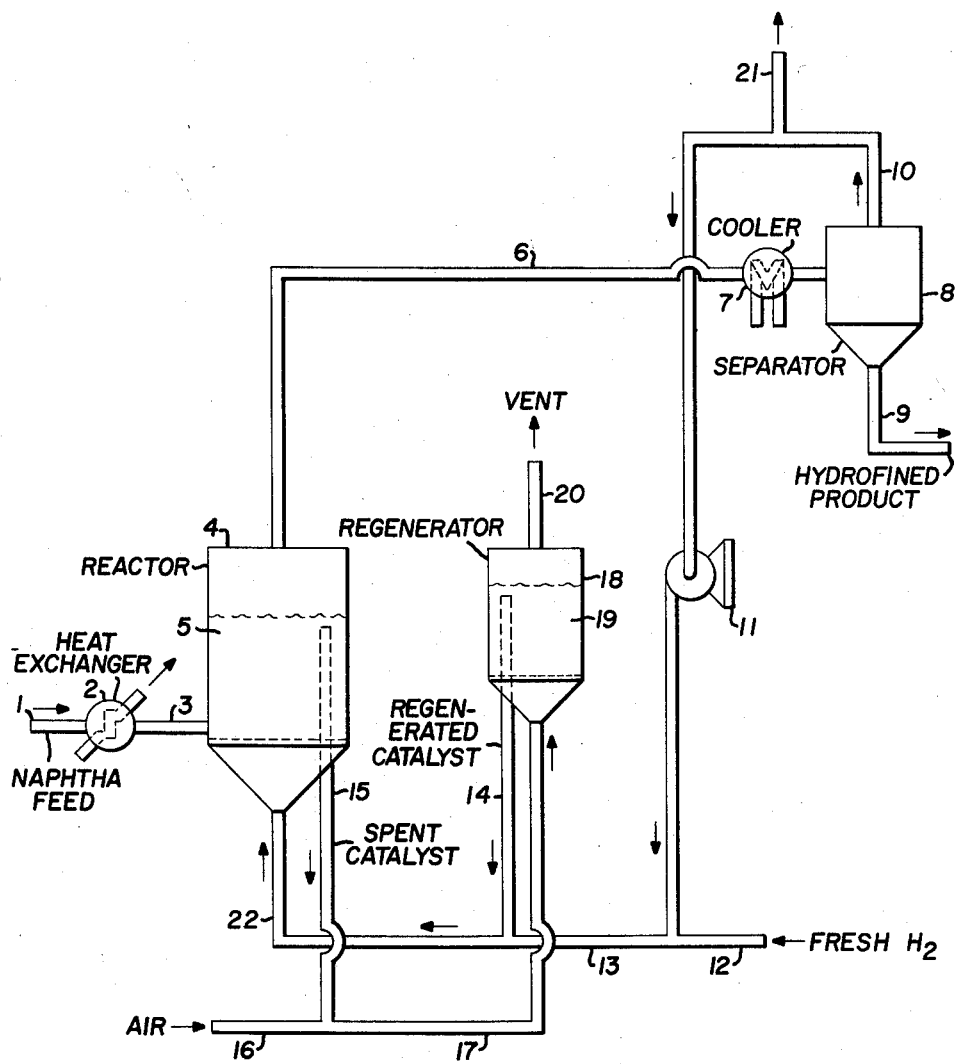
John Weikart
Robert C. Morbeck   Inventors

John Weikart, Westfield, and Robert C. Morbeck, Fanwood, N.J., assignors to Esso Research and Engineering Company, a corporation of Delaware Application October 28, 1955, Serial No. 543,364

3 Claims. (Cl. 208—143)

This invention relates to an improved process for upgrading by hydrofining petroleum naphthas containing appreciable amounts of unsaturated hydrocarbons.

Various petroleum conversion reactions result in the production of naphthas containing appreciable amounts of sulfur and particularly unsaturated hydrocarbons. Typical of this type conversion is the fluid coking operation, e.g. see allowed cases Serial No. 433,913, filed June 2, 1954, now U.S. Patent No. 2,725,349, and Serial No. 431,412, filed May 21, 1954, now U. S. Patent No. 2,721,169.

Hydrofining of naphthas containing these unsaturated hydrocarbons gives rise to certain difficulties in conventional fixed bed operations. Thus, the processing of coker naphtha due to the presence of a large quantity of mono-olefins and diolefins is extremely exothermic in the hydrodesulfurization and hydrogenation operations. The heat liberated gives a marked temperature rise during the reaction with adverse results. While this temperature rise can be controlled, it is difficult and expensive.

This invention provides an improved process for upgrading such naphthas. The process comprises briefly injecting a petroleum naphtha feed in the liquid state directly into a dense, turbulent, fluidized bed of a hot hydrofining catalyst. The feed is then treated in the vapor phase at elevated temperatures with hydrogen at conditions spelled out in further detail below. The exothermic heat evolved from the hydrogenation of the unsaturated hydrocarbons permits this direct injection of the feed in most cases without the necessity of providing for a preheating furnace.

The petroleum naphthas treated in this process are quite specific in nature. They must be completely vaporized under the treating conditions. Their boiling point range is thus in the range of about 65° to 450° F. depending upon specific operating conditions required and they contain unsaturated hydrocarbons in the range of about 40 to 100 volume percent. Typically they can also contain about 0.2 to 1.5 weight percent sulfur.

The hydrofining catalysts that can be employed include 5–15% molybdena oxide on activated alumina, mixtures of cobalt oxides (3–6 wt. percent) and molybdenum oxides (6–9 wt. percent), cobalt molybdate on activated alumina, and other sulfur resistant hydrogenation catalysts. Typical particle size analyses are 0–20 micron 0–10%, 20–40 micron 10–20%, 40–80 micron 50–70%, 80–100 micron 10–20%, 100–150 micron less than 10%, and 150+ less than 1%.

The hydrogen containing gas is utilized for fluidizing the catalyst and maintaining the particles in the form of a dense, turbulent, fluidized bed as well as for treating purposes. The hydrogen consumed in the process is considered to react with unsaturated compounds in the feed to form more saturated compounds and with sulfur compounds to form hydrogen sulfide. The molecules from which sulfur is released are in turn saturated. The hydrogen-containing gas that is used in the present process consists partially of fresh gas that is added to the system and partially of recycle gas that is returned from the reactor exit to the reactor inlet.

Regeneration of the catalyst may be required periodically, depending largely upon the nature of the feed stock. As compared with catalytic cracking operations, the fluid hydrofiner has a very low carbon formation rate. This means that the regenerator is quite small and that only a small stream of catalyst needs to be regenerated. In other words the catalyst to oil ratio in this process is extremely small.

This invention will be better understood by reference to an example and the flow diagram shown in the drawing. This example is for hydrofining a high sulfur 0.9 wt. percent, coker naphtha having the following inspections:

| | |
|---|---|
| Gravity, °API | 53 |
| IBP | 140 |
| 10% | 208 |
| 50% | 293 |
| 90% | 392 |
| FBP | 441 |
| Bromine No. | 112 |
| Research O.N. 2 cc. TEL | 82 |
| GM gum | 21 |

This stock was hydrofined at 50 p.s.i.g. pressure, 675° F. reactor temperature, with 3500 s.c.f./b. hydrogen rate, 100% hydrogen concentration, and at 2 severity levels 0.9 and 1.9 w./hr./w.

Referring now to the attached flow plan, liquid coker naphtha feed at 100° F. enters the system through line 1. It is preheated in heat exchanger 2 and then flows through line 3 directly into the fluidized solids vessel 4 where it is vaporized. No furnace is required to reach the 675° F. reactor temperature as heat is evolved from the hydrogenation of olefins. The fluidized bed 5 of cobalt molybdate on alumina is supported by the fresh hydrogen and the hydrogen recycle gas which enter at the bottom through line 22. The hydrofined naphtha goes overhead along with the hydrogen through line 6 where it is cooled to 100° F. or so in cooler 7 and the liquid product and gas is separated at 50 p.s.i. in separator 8. The desulfurized and stabilized coker naphtha product leaves the system through line 9 and enters the refinery's gasoline blending facilities. The high pressure hydrogen rich gas is taken off the top of separator 8 and recycled through line 10 and recycle compressor 11 back to the bottom of the hydrofiner reactor through line 13. If desirable, a scrubber can be installed in line 10 to remove $H_2S$ from the gas. Sufficient hydrogen to equal the hydrogen consumption plus purge enters through line 12 and goes with the recycle gas into the hydrofiner reactor. Some hydrogen rich gas is purged through line 21. This is done in order to maintain the desired hydrogen concentration in the recycle gas.

A small portion of the fluidized catalyst in the hydrofiner reactor 4 can be taken through standpipe 15 and sent to the regenerator for carbon removal. This catalyst is transported to the regenerator by the air entering at line 16 and the spent catalyst and air travel through line 17 to the bottom of the regenerator 18. The regenerator has a fluidized solids bed 19 at a temperature of 950° F. Regenerated catalyst is transported back to the reactor through standpipe 14 and is picked up by the hydrogen recycle gas. The catalyst and recycle gas enter the hydrofiner reactor through transfer line 22. Flue gas leaves the top of the regenerator and is vented through line 20. The regeneration can be intermittent as the heat evolution from hydrogenation of olefins is utilized to furnish part of the requirements.

For the operation considered here, a catalyst comprising cobalt oxide (3%) and molybdenum oxide (9%) on activated alumina was employed.

Product quality was improved as shown below:

|  | Feed | Hydrofined |  |
|---|---|---|---|
| W./Hr./W | | 0.9 | 1.9 |
| Gravity, ° API | 53 | 52 | 52 |
| Sulfur, Wt. Percent | 0.89 | 0.02 | 0.23 |
| Bromine No | 112 | 33 | 67 |
| Research Octane, 2 cc. TEL | 82 | 71 | 79 |
| GM Gum | 21 | | 7 |

In addition to the indicated improvements in sulfur and gum formation tendencies, the hydrofining products are sufficiently stable so that they can be directly blended into gasoline.

In order to explain the process more fully the following conditions of operation of the various components are set forth below.

*Conditions in reactor*

|  | Broad Range | Preferred Range |
|---|---|---|
| Temperature, ° F | 600–800 | 650–700 |
| Pressure, p.s.i.g | 25–400 | 50–100 |
| S.c.f. H₂ containing gas/bbl. feed | 500–4,000 | 2,000–3,500 |
| Concentration of H₂ in H₂ containing gas, vol. percent | 50–100 | 75–100 |
| Catalyst/oil ratio | 0–0.5 | ca. 0.1 |
| W./Hr./W | 0.5–8.0 | 0.5–2.0 |
| Gas Velocity, ft./sec | 0.1–2.0 | 0.5–1.0 |

*Conditions in regenerator*

|  | Broad Range | Preferred Range |
|---|---|---|
| Temperature, ° F | 800–1,200 | 900–1,000 |
| Pressure, p.s.i.g | 25–400 | 50–100 |
| Residence Time, Hrs | 0.1–10 | 0.1–2 |
| Fluidizing Gas, superficial velocity | 0.1–2.0 | 0.5–1.0 |

The advantages of the process will be apparent to the skilled in the art. Heat transfer surfaces are minimized because relatively cold feed is injected in the liquid phase directly into the reactor vessel once the reaction is initiated. An auxiliary preheating furnace can thus be eliminated. The problem of carbonaceous material depositing out when the feed stock is vaporized is eliminated. With liquid injection into the fluid solids vessel, any carbonaceous material is laid down on the catalyst where it is readily burned off.

Any type of olefinic feed stocks can be adequately processed by this fluid hydrofining process. Thus, in some cases it may be desirable to partially hydrogenate catalytic C₅'s. These stocks have very high bromine numbers but quite low sulfur contents. Similar stocks such as polymers can also be hydrogenated or fractions from light catalytic naphthas.

It is to be understood that this invention is not limited to the specific examples which have been offered merely as illustrations and that modifications may be made without departing from the spirit of the invention.

What is claimed is:

1. A process for hydrogenation of a petroleum naphtha which comprises the steps of injecting in the liquid state a petroleum naphtha feed having a boiling point range in the range of about 65° to 450° F. and containing about 40 to 100 volume percent unsaturated hydrocarbons directly into a dense, turbulent, fluidized bed of a heated hydrofining catalyst selected from the group consisting of alumina supported molybdenum oxide, cobalt oxide and molybdenum oxide, and cobalt molybdate, and mixtures thereof in a reaction zone and contacting the naphatha feed at a temperature in the range of 600° to 800° F. in the vapor phase in the fluidized bed with hydrogen at a pressure in the range of 25 to 400 p.s.i.g., the exothermic heat released in situ by the hydrogenation of the unsaturated hydrocarbons being sufficient in amount to permit the direct injection of the liquid feed and to completely vaporize said feed except for carbon deposits therefrom on the catalyst.

2. The process of claim 1 in which the naphtha feed also has a sulfur content in the range of about 0.2 to 1.5 weight percent.

3. The process of claim 1 in which the catalyst employed contains from 3 to 6 weight percent cobalt oxide and from 6 to 9 weight percent molybdenum oxide on activated alumina.

References Cited in the file of this patent

UNITED STATES PATENTS

| 2,303,075 | Frey | Nov. 24, 1942 |
| 2,332,572 | Hepp et al. | Oct. 26, 1943 |
| 2,396,109 | Martin | Mar. 5, 1946 |
| 2,449,027 | Voorhies | Sept. 7, 1948 |
| 2,662,050 | Moorman et al. | Dec. 8, 1953 |
| 2,707,698 | Johnson et al. | May 3, 1955 |
| 2,707,699 | Johnson et al. | May 3, 1955 |